D. F. CURTIN.
BUTTER MEASURER AND CUTTER.
APPLICATION FILED JULY 28, 1908.
924,642.
Patented June 15, 1909.
2 SHEETS—SHEET 1.
Fig. 1.
Fig. 2.
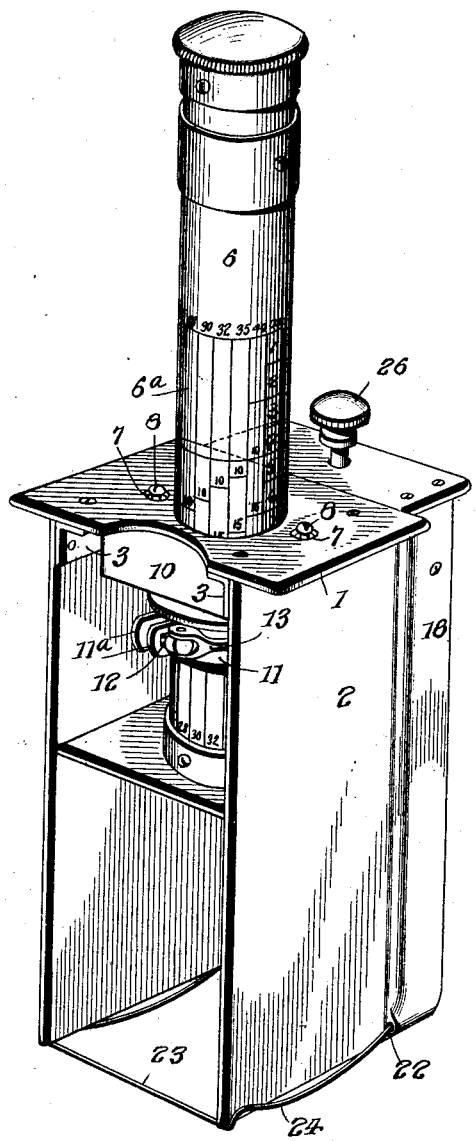
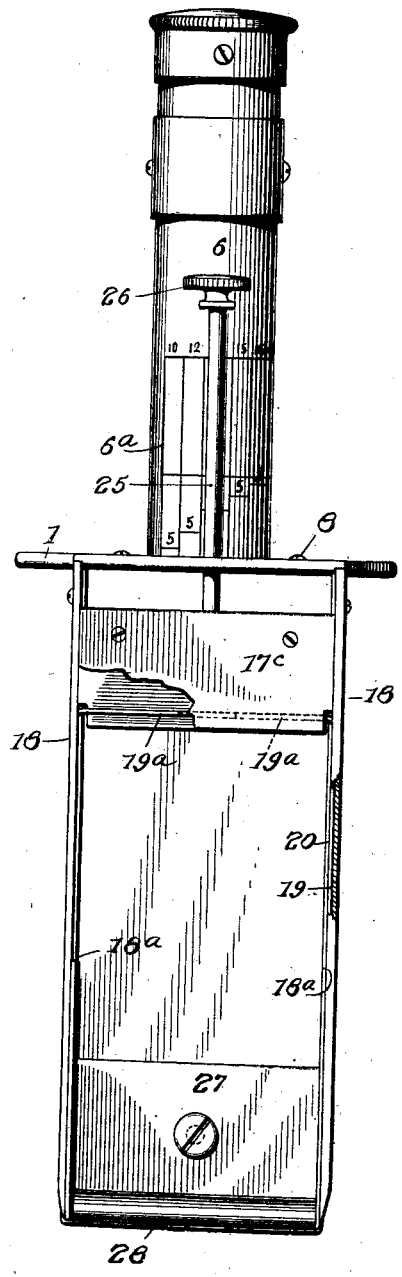
WITNESSES
L. H. Schmidt
H. S. Brock
INVENTOR
DAVID F. CURTIN,
BY Munn & Co.
ATTORNEYS D. F. CURTIN.
BUTTER MEASURER AND CUTTER.
APPLICATION FILED JULY 28, 1908.
924,642.
Patented June 15, 1909.
2 SHEETS—SHEET 2.
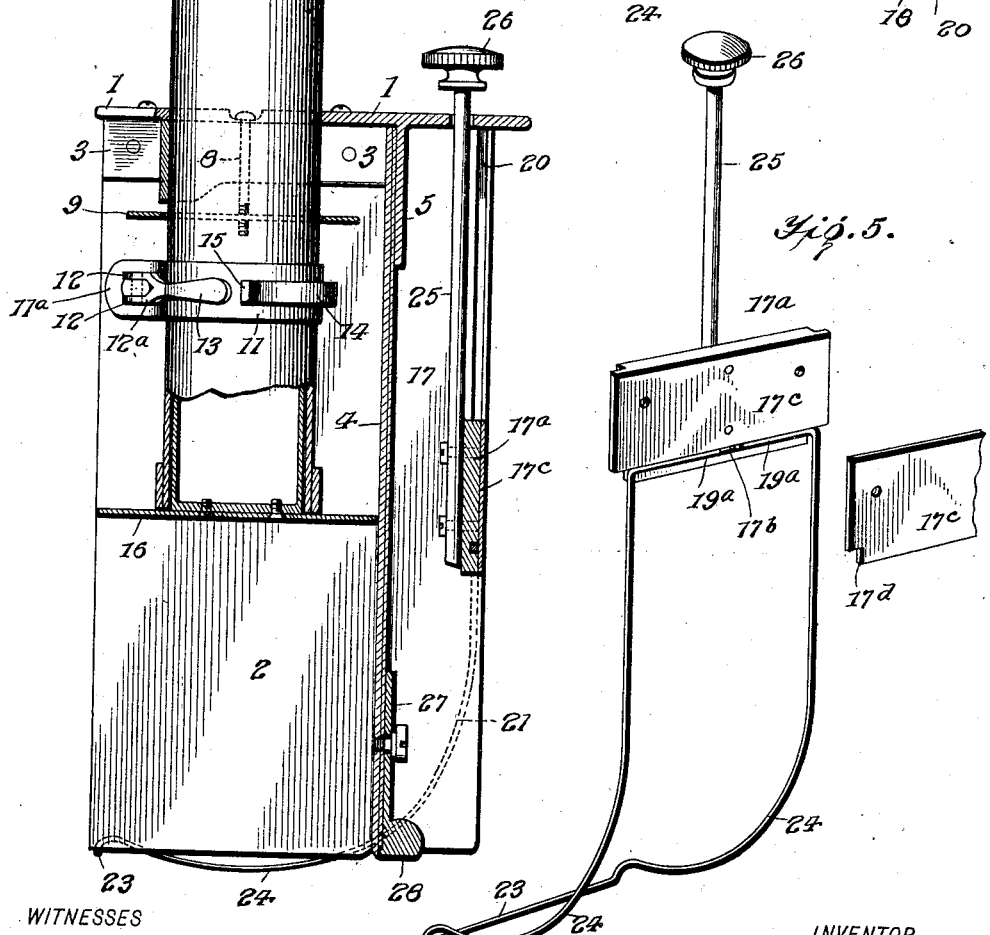
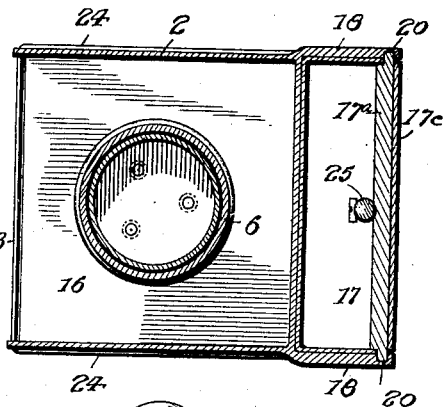
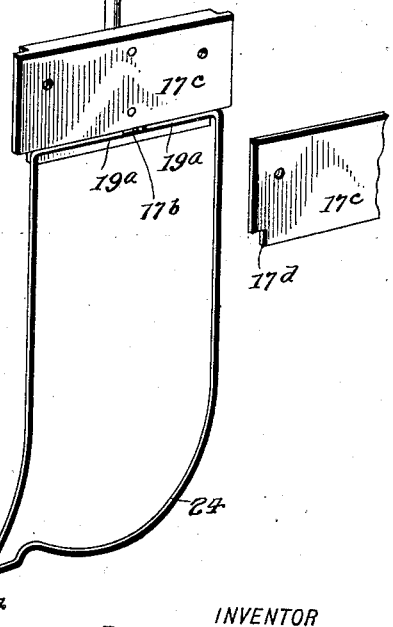
WITNESSES
INVENTOR
DAVID F. CURTIN,
BY
ATTORNEYS.

UNITED STATES PATENT OFFICE.

DAVID F. CURTIN, OF ST. LOUIS, MISSOURI.

BUTTER MEASURER AND CUTTER.

No. 924,642.  Specification of Letters Patent.  Patented June 15, 1909.

Application filed July 28, 1908. Serial No. 445,718.

*To all whom it may concern:*

Be it known that I, DAVID F. CURTIN, a citizen of the United States, and a resident of St. Louis, in the State of Missouri, have made certain new and useful Improvements in Butter Measurers and Cutters, of which the following is a specification.

My invention relates to improvements in devices for cutting butter and simultaneously measuring the quantity of the same, the object of my invention being to provide a simple and efficient device by means of which butter may be cut into prints or blocks and conveniently separated from the rest of the butter in the tub or package, the prints or blocks being of predetermined weight, thereby dispensing with the necessity of weighing the butter, as is now commonly done.

With these and other objects in view my invention consists in certain novel features of construction, arrangement and combina- of parts, as will be hereinafter more fully described and pointed out in the claims, reference being had to the accompanying drawings in which—

Figure 1 is a perspective view of my device; Fig. 2 is a rear view of same; Fig. 3 is a vertical longitudinal section; Fig. 4 is a horizontal section, and Fig. 5 is a perspective view of the slide which carries and operates the cutting wire, the view showing the plate which holds the ends of cutting wire in place.

In carrying out my invention I use a box-like mold or structure open at the front and bottom as shown in Fig. 1, the top piece 1 has secured to it the side walls 2, 2, by means of the angle plates 3, 3, the rear wall 4 of the mold may be integral with the side walls or secured to same in any suitable manner, it being secured to the top plate by the extension 5.

The top plate or wall 1 is provided with a circular aperture through which the cylindrical computing chart $6^a$ passes; this cylindrical computing chart also constitutes the handle of the plunger for ejecting the block of butter from the mold. At each side of the aperture through which the plunger 6 passes are located smaller apertures 7, 7, through which pass threaded bolts 8, 8, the lower ends of said bolts screwing into a flat circular ring 9 which surrounds the plunger 6 fitting said plunger loosely and being normally held suspended by the bolts 8 slightly below a vertical flange 10 extending downwardly from the top wall 1 of the mold.

The handle or plunger 6 which is tubular, has as stated a computing chart $6^a$ delineated thereon by means of which any given quantity of butter at a given price may be provided for, this is done by means of a split clamp ring 11 having the ends $11^a$ turned at an angle, and a headed bolt 12 passing through said ends on the threaded end of the bolt is threaded a nut while to the head of the bolt is pivoted the cam ears $12^a$ of a lever 13, by means of which the angular ends of the split ring 11 may be drawn toward each other to clamp said split ring on the tubular computing chart at any desired point. Secured to the split ring is a curved spring plate 14, one end of said plate being secured to said split ring and then curving around the plunger, being sprung away somewhat from the same, the free end 15 being bent at substantially a right angle to the rest of the plate.

To the bottom of the tubular plunger rod 6 is secured a plunger plate 16 which fits within the walls of the mold being free to slide up and down between the same.

At the back of the mold is disposed an auxiliary chamber 17 within which is disposed the slide $17^c$ which carries the cutting wire 19, in the side walls 18 of the auxiliary chamber, and near their edge the grooves 20 are made, said grooves running straight a suitable distance and then curving as indicated by dotted lines 21 in Fig. 3. The cutting wire has its upper ends $19^a$ bent inwardly, said ends lying in a groove $17^b$ in the slide $17^a$ the said ends being retained in place by a plate $17^c$ secured to the outer face of the slide, the wires pass down on each side in the grooves 20 and through the curved passage 21 (dotted lines) passing out through openings 22 at the lower end of the side walls 18 which project beyond side walls 2, 2 so that the wire lies outside of the side walls 2 of the main chamber and then bent downwardly as at 24 and transversely as at 23 across the bottom of the mold, the bends 24 cause the wire to hug the sides of the walls 2 and thus the wire is guided by said walls.

To the inner side of the slide $17^a$ is secured a rod 25 which extends upwardly and through an opening in the top wall of the auxiliary chamber 17 and has a handle or knob 26 thereon to manipulate the same. The side walls 18 of chamber 17 have shoulders $18^a$ which forms a limiting stop for the slide $17^a$ the face plate $17^c$ of which has notched corners 17ᵈ. At the lower end of the auxiliary chamber a plate 27 having a horizontal flange 28 is removably secured to the inner wall of said chamber, this plate is to be removed when cutting out the first piece of butter to make an opening in the tub of butter. It is then replaced and it then prevents that edge from cutting into the mass of butter, after the first opening is made, then the wire and two sides of the cutter do the cutting and this wall carrying the flanged plate 27 slides down closely against the wall formed by first cut and really forms a guide for cutting straight.

To operate the cutter first adjust the split clamp ring 11 on the computing chart at the marks indicating the amount of weight required, then push out the wire cutter as far as it will go, this being readily done by placing the palm of the hand against the knob 26 and tips of the fingers against the top piece through which the rod 25 passes, then push the plunger which carries the computing chart, down as far as it will go, the device is now ready to cut out the brick or block which is done in this manner. As the device is forced into the butter the plunger can be seen rising and when not in position to be seen the user will know by the pressure against his or her thumbs of the heads of bolts 8 which as previously stated project upwardly from the flat ring 9, the knob 26 is now pulled upward carrying the slide 17ᵃ with it causes the transverse part 23 of the wire to cut off the block or brick of butter at its lower end, the block of butter now within the mold cutter will be the weight required and the whole device can be removed from the tub the block clinging to the mold from which it can now be discharged as desired by pushing down on the plunger 6.

It will be noticed that the transverse wire 23 performs the double function of making first a vertical cut and then later of making a horizontal cut which separates the block of butter from the mass in the tub.

The plate or arm 14 may be made as a part of the split clamp ring 11 and the end 15 is to project far enough outwardly to strike against the wall of the cutter and prevent the split ring from turning too far to the side; by this arrangement the cam lever will always be in position to be manipulated.

I claim:

1. A butter cutter and mold consisting of a box open at one side and at one end, a cutting device made of a single piece of wire comprising vertical members and a transverse member adapted to travel across the lower end of the mold, and guides for said vertical members.

2. A butter cutter and mold consisting of a box open at one side and at one end and adapted to be introduced into a mass of butter to separate a part therefrom, a cutting device made of a single piece of flexible wire comprising vertical members and a transverse member adapted to travel across the lower end of the mold, the vertical members curved to hug the outer faces of the side walls of the mold, a slide bar connecting the upper ends of the vertical members, and guides for the vertical members.

3. A butter cutter and measurer consisting of rear and side walls adapted to be entered into a mass of butter and separate a part therefrom, a plunger adapted to slide within said walls, said plunger having a computing chart thereon, an ejector secured to the lower end of said plunger and a signal device operated by vertical movement of said plunger.

4. A butter cutter and measurer, consisting of rear and side walls adapted to be entered into a mass of butter and separate a part therefrom, a cutting wire adapted to be moved across the lower ends of said walls, a plunger having a computing chart thereon and sliding vertically within said walls, an adjustable gage ring mounted on said plunger to regulate weight, and a signal device mounted on said cutter adapted to be operated by said gage ring.

5. A butter mold open at one side and at its bottom, in combination with a cutter consisting of a single piece of wire comprising a horizontal transverse bottom member and vertical side members, said vertical members adapted to travel in curved grooves, and said transverse member adapted to travel straight across the lower end of the mold.

6. A butter cutter and mold open at one side and the bottom and adapted to be introduced into a mass of butter to separate a part therefrom a plunger adapted to slide in said mold, a single cutting wire comprising vertical members and a transverse member adapted to travel across the lower edge of the mold, a slide mounted on said mold and carrying said vertical members, and means for operating said slide.

7. A butter cutter and mold consisting of rear and side walls adapted to be entered into a mass of butter to separate a part therefrom, a single cutting wire adapted to travel across the lower end of said walls, a plunger adapted to slide within said walls, means for indicating the quantity of butter to be cut, means for limiting the movement of the plunger, and means for causing the travel of the cutting wire across the lower ends of the wall in a straight line to complete separation of the block of butter from the mass.

DAVID F. CURTIN.

Witnesses:
MAUDE DIXSON,
R. M. ARMOUR.